A. J. BALDWIN.
SINGLE STRAND WIRE GLASS MACHINE.
APPLICATION FILED JUNE 3, 1915.
1,169,759.
Patented Feb. 1, 1916.
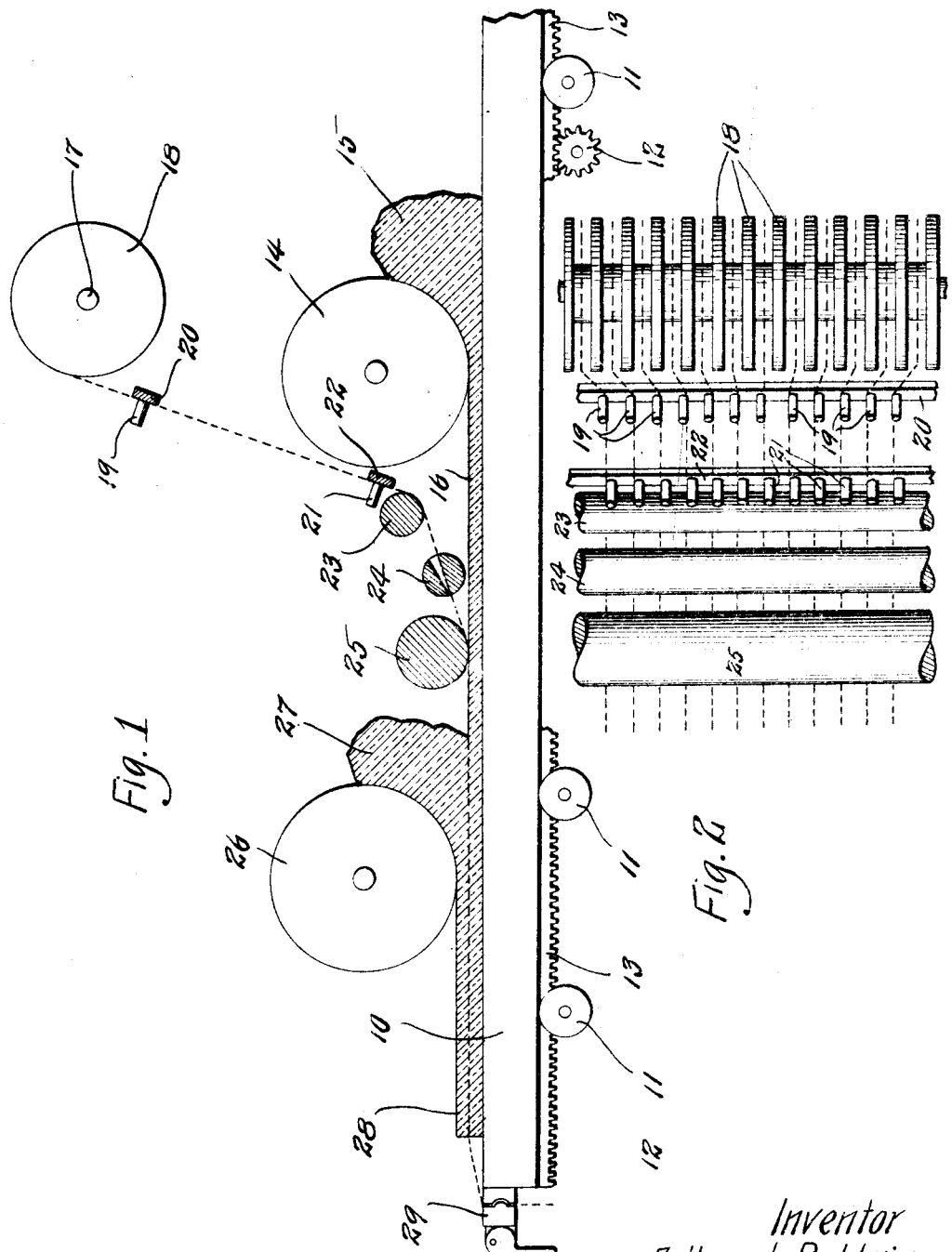
Inventor
Arthur J. Baldwin

UNITED STATES PATENT OFFICE.

ARTHUR J. BALDWIN, OF NEW YORK, N. Y., ASSIGNOR TO MISSISSIPPI WIRE GLASS COMPANY, OF NEW YORK, N. Y., A CORPORATION OF NEW JERSEY.

SINGLE-STRAND-WIRE-GLASS MACHINE.

1,169,759.         Specification of Letters Patent.         Patented Feb. 1, 1916.

Original application filed December 21, 1908, Serial No. 468,508. Divided and this application filed June 3, 1915. Serial No. 32,000.

*To all whom it may concern:*

Be it known that I, ARTHUR J. BALDWIN, a citizen of the United States, residing at New York city, New York, have invented a certain new and useful Improvement in Single-Strand-Wire-Glass Machines, of which the following is a full, clear, and exact description, such as will enable others skilled in the art to which it appertains to make and use the same, reference being had to the accompanying drawings forming part of this specification.

This invention relates to new and useful improvements in single strand wire glass machines and the subject-matter of this application is a division of my application for single strand wire glass machine filed December 21, 1908, Serial No. 468,508.

By "single strand" I mean that instead of embedding a wire mesh into the sheet of glass, as has heretofore been largely practised, I propose to embed one or more single strands of wire into the sheet of glass, said strands being so arranged with respect to each other that they are electrically insulated from each other, the ends of the wires preferably projecting beyond the sheet of glass to afford means for electrically connecting said wires together.

The single strand sheets of glass made by my improved machine are used for various purposes, among which may be mentioned windows and skylights, the walls and partitions of elevator shafts, for dust and wind guards of automobiles and other places where it is desired to have single strands of wire embedded in the glass instead of the wire mesh as has heretofore been used. By reason of the fact that two or more of the strands of wire in a sheet of glass can be electrically connected, said glass is also applicable for use in connection with vaults, jail-lights, show-cases or wherever an alarm element is valuable and necessary.

With the foregoing and other objects in view, my invention consists in certain novel features of construction and arrangement of parts, hereinafter more fully described, claimed and illustrated in the accompanying drawings, in which—

Figure 1 is a side elevational view of a machine of my improved construction with parts thereof in section. Fig. 2 is a fragmentary plan view of parts of the machine.

Referring by numerals to the accompanying drawings, 10 designates a table on which the sheet of glass is formed, said table being mounted for reciprocatory movement upon a series of rollers 11 and said table being moved in any suitable manner preferably by means of a pinion 12 which engages a rack 13, the latter being fixed to and depending from said table. An initial spreading roller 14 is mounted for rotary movement above the table 10, said roller being adapted to initially spread the pour 15 of molten glass into sheet form as designated by 16. Arranged at a suitable point above the table 10 is a shaft 17 on which is loosely mounted a series of bobbins 18, each containing a strand of wire of appropriate gage. By thus mounting the bobbins loosely on the shaft 17 they may be readily shifted lengthwise on said shaft, properly spaced apart, or readily removed, thus permitting the introduction of various sizes of bobbins according to the length of wire required.

The wires from all the bobbins feed between the teeth 19 of a comb 20, the same being located adjacent to the series of bobbins and the teeth of said comb are relatively closer together than the bobbins so that the wires converge from the bobbins toward the comb and from the latter said wires pass in parallel lines downward to the point where they are embedded in the glass. Said wires pass between the teeth 21 of a second comb 22, the latter being located adjacent to roller 14 and being for the purpose of holding the wires properly spaced apart. Immediately adjacent to this comb 22 is an idle roller 23 beneath which the wires pass and from thence said wires pass through a slotted guide 24, the same being located slightly above the surface of table 10.

An embedding roller 25 is mounted for rotation in suitable bearings at a point adjacent to the slotted guide 24, the surface of which embedding roller is preferably smooth and as the table 10 moves toward the left hand, this roller embeds the strands of wire in the top surface of the sheet of glass 16.

A finishing roller 26 is mounted in suitable bearings above the table 10 which finishing roller is for the purpose of spreading the second pour 27 of molten glass in sheet form over the sheet 16 and the strands of wire embedded therein, thus producing the completed sheet of glass 28.

A suitable clamping device 29 is positioned on the forward end of the table, which device is adapted to firmly grip the ends of all of the strands of wire.

In operation, the table 10 is moved toward the right hand until its forward end is positioned beneath roller 14. The first pour 15 of molten glass is now dumped onto said table to the rear of roller 14 and the table is now advanced until the ends of the wires are in position to be engaged by the clamping device 29. After the ends of the wires have been gripped by said device, the table is further advanced and during such movement the wires from the bobbins pass downward between the teeth of combs 20 and 22, beneath idle roller 23, through slotted guide 24, and beneath roller 25 which embeds the strands of wire in the top of the sheet of glass 16 formed from the first pour. The table is further advanced and the second pour of molten glass is dumped onto the first sheet 16 immediately to the rear of roller 26 and as said table continues to advance the second sheet 28 is formed immediately on top of the first sheet 16 with the single strands of wire embedded between the two sheets. The table is moved forward until both pours of glass are spread, thus completing the finished sheet, and after the wires have been severed at the rear end of said sheet, the latter is removed from the table and annealed in the usual manner.

When the ends of the strands of wire are engaged by the clamp 29 at the forward end of the table, it will be understood that said clamp occupies a position immediately adjacent to roller 25 and for this reason very little wire is lost or projects from the forward end of the completed sheet.

The two sets of combs and the idle roller 23 direct the strands of wire accurately to the centers of the slots in the bar 24 and this prevents the splices in the wires from catching and interfering with the free operation of the device.

When the sheet is finished the wires are cut off immediately ahead of embedding roller 25, leaving projecting ends of sufficient length at the rear end of the completed sheet, and likewise leaving ends of sufficient length in front of the slotted bar 24 so that the ends of the wires will not spring backwardly through said bar.

The combs 20 and 22 together with idle roller 23 form tensioning means to regulate and control the movement of the strands of wire in their passage from the bobbins 18 to the point where they are embedded in the first sheet 16, and as the bobbins are independently mounted on the shaft 17 it is not necessary to provide independent tensioning means for the various strands of wire.

It will be readily understood that minor changes in the size, form and construction of the various parts of my improved device can be made and substituted for those herein shown and described, without departing from the spirit of my invention, the scope of which is set forth in the appended claims.

I claim:

1. In a machine for making single strand wire glass, the combination with a reciprocatory table, of a pair of glass spreading rollers spaced apart and mounted for rotation in fixed bearings above said table, bobbins constituting a source of wire supply, means for converging the single strands of wire fed from said bobbins, means for spacing apart and converging said single strands to the layer of molten glass formed by the first spreading roller, and means for embedding said single strands in said layer of glass before the latter passes beneath the second spreading roller.

2. In a machine for making single strand wire glass, the combination with a reciprocatory table and spreading rollers, which latter are mounted for rotation in relatively fixed bearings, of an embedding roller having a smooth surface, a series of independently mounted bobbins constituting a source of wire supply, and means including a slotted guide interposed between said bobbins and the embedding roller for converging and spacing apart the strands of wire which feed from said bobbins.

3. In a machine for making single strand wire glass, the combination with a reciprocatory table and spreading rollers, which latter are mounted for rotation in relatively fixed bearings, of an embedding roller having a smooth surface, a relatively fixed slotted wire guiding member located adjacent to said embedding roller, a series of independently mounted bobbins constituting a source of wire supply, and means for spacing apart and converging the single strands of wire from the bobbins to the slotted guiding member.

4. In a machine for making single strand wire glass, the combination with a reciprocatory table and spreading rollers, which latter are mounted for rotation in relatively fixed bearings, of an embedding roller having a smooth surface, a series of independently mounted bobbins constituting a source of wire supply, and a comb for spacing apart and converging the strands of wire, which feed from the bobbins to the embedding roller.

5. In a machine for making single strand wire glass, the combination with a reciprocatory table, spreading rollers, which latter are mounted for rotation in relatively fixed bearings, and an embedding roller having a smooth surface, of a series of independently mounted bobbins constituting a source of wire supply, a wire guiding member located adjacent to the embedding roller, and a plurality of elements for spacing apart and converging the strands of wire feeding from the bobbins to the wire guiding member adjacent to said wire guiding member.

In testimony whereof I hereunto affix my signature in the presence of two witnesses, this 29th day of May, 1915.

ARTHUR J. BALDWIN.

Witnesses:
HOWARD A. FLUCKIGER,
F. M. VAN WAGONER.